United States Patent [19]
O'Donnell et al.

[11] Patent Number: 5,308,497
[45] Date of Patent: May 3, 1994

[54] METHOD OF ABSORBING PETROLEUM-BASED PRODUCTS

[75] Inventors: Raymond T. O'Donnell, Lawton; Melvin J. Schaub, Holland, both of Mich.

[73] Assignee: United Technologies Automotive, Inc., Dearborn, Mich.

[21] Appl. No.: 937,334

[22] Filed: Aug. 31, 1992

[51] Int. Cl.$^5$ .............................................. C02F 1/28
[52] U.S. Cl. ...................................... 210/693; 210/924
[58] Field of Search ...................... 210/680, 693, 242.2, 210/924; 134/7

[56] References Cited

U.S. PATENT DOCUMENTS

| | | | |
|---|---|---|---|
| 3,565,257 | 2/1971 | Cavalieri | 210/242 |
| 3,739,913 | 6/1973 | Bogosian | 210/924 |
| 4,004,324 | 1/1977 | Bridges et al. | 19/156.3 |
| 4,006,079 | 2/1977 | Langlois et al. | 210/680 |
| 4,519,918 | 5/1985 | Ericsson et al. | 210/680 |
| 4,659,478 | 4/1987 | Stapelfeld et al. | 210/690 |
| 4,750,775 | 6/1988 | Miller | 296/38 |
| 4,769,084 | 9/1988 | Gubela | 134/7 |
| 4,832,852 | 5/1989 | Wells et al. | 210/671 |
| 4,965,129 | 10/1990 | Bair et al. | 428/398 |

FOREIGN PATENT DOCUMENTS 1132545 10/1962 Fed. Rep. of Germany.

OTHER PUBLICATIONS

Pigalog, vol. IV, No. 3, Jul. 1991, pp. 4-11; 18-23; 31-35; 56; 58-60.

Primary Examiner—Ivars Cintins
Attorney, Agent, or Firm—Pamela J. Curbelo; William W. Habelt

[57] ABSTRACT

The sorbent of the present invention is useful in adsorbing petroleum-based products such as oil and gasoline, particularly from the surface of water. This sorbent, which is comprised of about 5 wt. % to about 70 wt. % cured, cross-linked resin and about 30 wt. % to about 95 wt. % fibers, selectively adsorbs the petroleum-based product due to its hydrophobicity.

12 Claims, 2 Drawing Sheets

METHOD OF ABSORBING PETROLEUM-BASED PRODUCTS

DESCRIPTION

1. Technical Field

The present invention relates to a method for adsorbing petroleum-based products, and especially to a method for adsorbing petroleum-based products using a sorbent.

2. Background of Invention

Waste disposal, oil spills, and other environmentally damaging accidents have become important and expensive situations which must be addressed. For example, oil and other petroleum-based product spills cost millions of dollars world wide. On the ocean, these spills damage shorelines and destroy marine life, while in the work place, these spills cause hazardous conditions resulting in significant work related injuries.

Containment and clean-up of petroleum-based product spills with chemical products and/or oil adsorbing materials has attained only partial success. Chemical products, such as detergents and surface active agents merely disperse the oil, thereby damaging a greater area but to a lesser degree. On the other hand, oil adsorbing materials such as straw or vermiculite, saw dust, and other materials, remove the petroleum-based product, but become waste products themselves. Additionally, these materials typically lack selectivity for the petroleum-based product. As a result, when a petroleum-based product is adsorbed from the surface of water, a large amount of the water is also simultaneously adsorbed, or adsorbed in preference to the petroleum-based product. The adsorbed water reduces the adsorption capacity and therefore the petroleum-based product compatibility of the material. Consequently, a greater amount of material must be utilized to adsorb the petroleum-based product, thereby increasing the amount of waste material produced and increasing the cost of the clean-up process.

In addition to petroleum-based product spills, waste materials from industries similarly cost millions of dollars world wide. For example, waste material is cut away from acoustic panels (used as package shelves, above head liners, beneath carpets, and in other areas within automobiles) which have been molded to net shape. This waste material often becomes land fill which is increasingly more expensive to dispose of as land fill sites become more scarce.

Waste disposal is a common, difficult, and often complex problem facing not only the automobile industry, but every industry, in some fashion. Environmental awareness and conservation, in many instances, has significantly increased the costs of waste clean-up and disposal. As a result, the recycling of by-products can be a lucrative business in addition to a manner of reducing operating costs and protecting the environment.

What is needed in the art is a means for recycling waste products and an inexpensive, efficient, sorbent for adsorbing petroleum-based products.

DISCLOSURE OF THE INVENTION

The present invention relates to a method for adsorbing petroleum-based products. This method comprises intimately contacting the petroleum-based product with a sorbent such that the petroleum-based product is selectively adsorbed into the sorbent, wherein the sorbent comprises a mixture of about 5 wt. % to about 70 wt. % cross-linked resin and about 30 wt. % to about 95 wt. % fibers.

The foregoing and other features and advantages of the present invention will become more apparent from the following description and accompanying drawings.

BEST MODE FOR CARRYING OUT THE INVENTION

Figure 1:
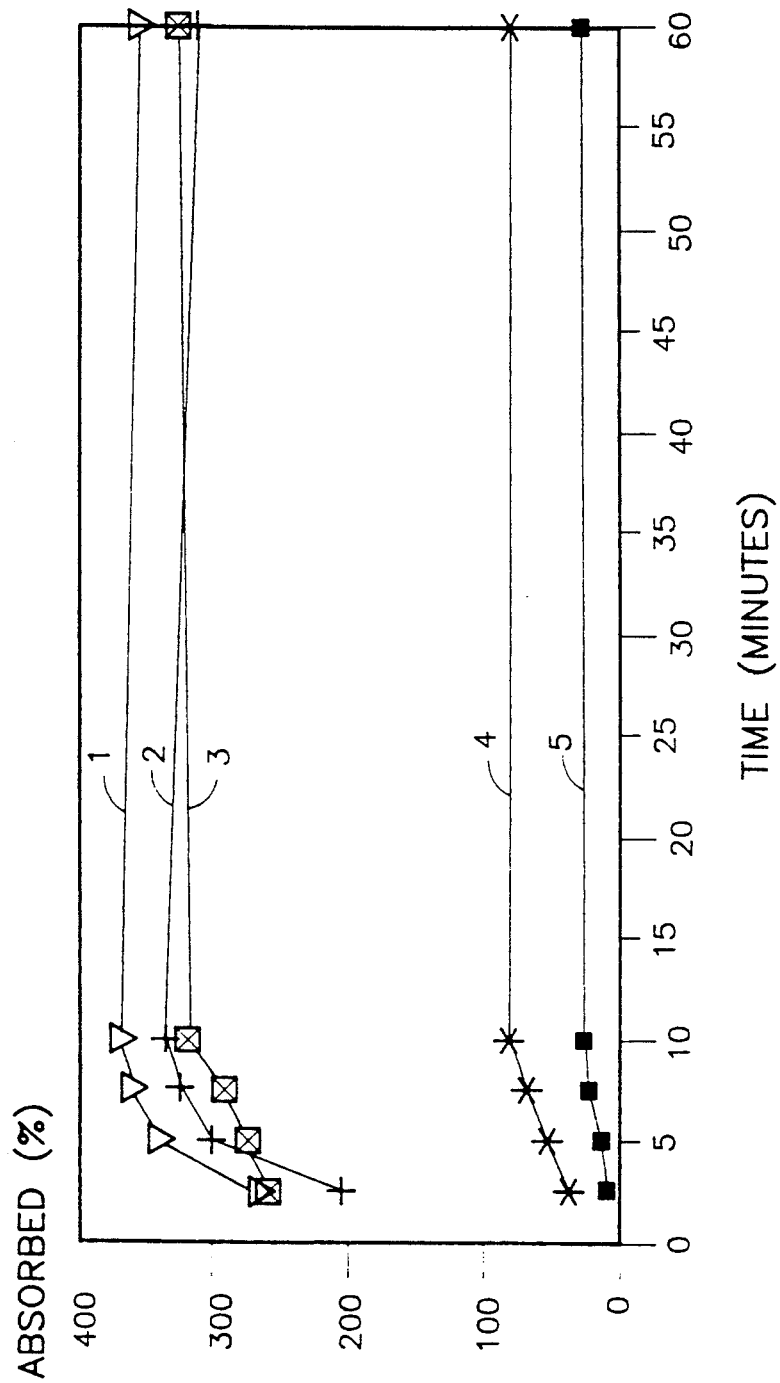
FIG. 1 is a graph of the adsorption efficiency of the sorbent of the present invention, over time.

The sorbent of the present invention comprises fibers coated with a cross-linked, hydrophobic resin. This resin imparts a hydrophobic quality to the sorbent such that the sorbent selectively adsorbs and/or absorbs (hereinafter referred to as adsorbs) petroleum-based products, such as 10W-30, 10W-40 oil, hydraulic oil, crude oil, other oils, gasoline, and other materials insoluble in water.

Fibers useful with the present invention can be natural or synthetic, including cellulosic based fibers and others such as cotton fibers, wood fibers, polyester fibers, nylon fibers, mixtures thereof, and others. Fibers which have proven particularly cost effective and environmental friendly include reprocessed woven and nonwoven materials which have been reduced to fiber form containing about 50% cellulose, 40% polyester, with the balance being processing aides and other additives, commonly known as "shoddy". This shoddy is available from Leigh Fibers, Inc., Spartanburg, South Carolina as product number 1568 B-01.

Resins which have proven useful in coating the fibers include cross-linkable resins possessing hydrophobicity, such as one and two stage phenolic resins. One example of an effective phenolic resin is a phenolic resin cured by cross-linking with formaldehyde, phenol-formaldehyde resin, such as Durite®, a two stage phenol-formaldehyde resin powder produced by Borden Chemical, a division of Borden, Inc., Columbus, Ohio. Phenol-formaldehyde resins are preferred due to their hydrophobic nature, and noncombustible, heat resistant properties.

The relative percentages of the resin and fibers typically range from about 5 wt. % to about 70 wt. % of the resin, to about 30 wt. % to about 95 wt. % fibers. About 15 wt. % to about 35 wt. % resin and about 65 wt. % to about 85 wt. % fibers is preferred based on the final weight of the sorbent.

Preparation of this sorbent is conventional. The sorbent can be formed in either a one step or a two step curing process which cures the resin by the application of heat, the use of a catalyst, or by another conventional curing technique.

In the one step process, the sorbent is formed in situ. The resin is introduced to the fibers in a conventional manner such as spraying, dusting, or dipping, among others. It is preferred that the resin be approximately uniformly distributed throughout the fibers to ensure an approximately uniform post-cure coating of the fibers and to improve the hydrophobicity and therefore the selectivity of the sorbent. The fibers and resin can therefore be mixed in any conventional manner to approximately uniformly distribute the resin throughout the fibers and form a fiber-resin mixture. The fiber-resin mixture is then cured by applying sufficient heat for a sufficient period of time, at a sufficient temperature to adequately cure such that the now resin coated fibers selectively adsorb petroleum-based products and does not substantially dissolve in the petroleum-based products. The heat can be applied via conventional heat treatment means such as an oven, furnace, kiln, oil press, or other conventional heat treatment means.

This curing process is both time and temperature dependent, as the temperature decreases, the cure time increases. Typically, the fiber-resin mixture is heat treated for up to about 10 minutes (min.), with about 1 min. to about 5 min. preferred, at a temperature of about 250° F. (121° C.) to about 500° F. (260° C.), with about 350° F. (177° C.) to about 450° F. (232° C.) preferred.

In contrast, the two step curing process includes a heat treatment step to partially cure or B stage the resin. This process, which is also time and temperature dependent, comprises mixing the fibers with the resin as described above, partially curing the resin, and then finally curing the partially cured resin. For example, for a phenol-formaldehyde resin, the resin is typically partially cured at about 275° F. (135° C.) to about 375° F. (190° C.), and preferably about 325° F. (163° C.) to about 365° F. (185° C.), for up to about 5 min., with about 10 seconds to about 3 min. preferred. The partially cured resin is then finally cured by cross-linking the resin at about 400° F. (205° C.) to about 500° F. (260° C.), with about 435° F. (224° C.) to about 465° F. (241° C.) preferred, for up to about 10 min., and preferably about 15 seconds to about 3 minutes, to form the sorbent. As with the one step curing process, the time and temperature of the final cure should be sufficient to adequately cure the resin such that the sorbent selectively adsorbs petroleum-based products and does not substantially dissolve in the petroleum-based products.

The partial curing step of the two step curing process is useful in areas where the fiber-resin mixture is to be molded into a given shape, such as the automotive industry. The partially cured resin retains a degree of thermal plasticity and therefore can be molded to shape with heat prior to or simultaneously with the final cure. It is not believed, however, that the use of the partial curing step effects the adsorption capabilities of the final sorbent.

Factors which do effect the sorbent's adsorption efficiency include the bulk density of the sorbent and the particular constraining means, if any, utilized. If the sorbent possess a high bulk density, the sorbent's wicking ability will be inhibited and adsorption efficiency will therefore decrease. At low bulk densities, sufficient void volume exists to readily allow wicking of the petroleum-based product into the sorbent. It is also believed that reducing the bulk density increases the available absorption surface area, and thereby improves absorption of the petroleum-based product. Therefore, sufficient void volume to enhance wicking while maintaining high retention of the adsorbed petroleum-based product is preferred and is readily determined by an artisan. Bulk densities of about 0.005 g/cm$^3$ (grams per cubic centimeter) to about 0.05 g/cm$^3$ can be utilized, with bulk densities of about 0.007 g/cm$^3$ to about 0.02 g/cm$^3$ preferred.

The bulk density of the sorbent can be altered in any conventional manner known in the art which does not adversely effect the sorbent. For example, the length of the fibers can be varied. Typically, the fiber lengths range from about 0.25 inches to about 2 inches. As the fiber length increases, the bulk density decreases. However, since the fibers are generally bound together by the resin during the curing process, the bulk density of the sorbent is high regardless of the fiber length. Therefore, the fibers in the sorbent can be sheared apart, a process commonly known as "pickering", or the sorbent can be ground in grinders, to lower the bulk density of the sorbent. The amount of pickering or grinding preferred is a balance between desired fiber length and the desire to separate the fibers from one another. This balance can readily be determined by an artisan. During the development of the present sorbent, the sorbent has typically been ground to about 0.25 inch to 0.5 inch fibers based upon the equipment which was available for the grinding.

Once the fibers and the resin have been mixed, the resin has been cross-linked, and the sorbent has been pickered, the sorbent is often constrained within a constraining means to provide structural integrity to the sorbent and improve handling. Although the sorbent can be used "as is", recovery of unconstrained sorbent can be difficult and labor intensive because of the pickered sorbent's lack of structural integrity. The constraining means can be any means which imparts structural integrity to the sorbent and forms the sorbent into a shape suitable for the desired application without significantly inhibiting the sorbent's ability to adsorb petroleum-based products or significantly reducing the bulk density of the sorbent. Possible constraining means include knitted and unknitted cotton, polyester, nylon netting, mixtures thereof, and other synthetic materials.

Due to the desired selectivity of the sorbent, hydrophobic constraining means are particularly useful since they can enhance the sorbent's selectivity. The hydrophobicity of the constraining means can be improved with conventional surfactants such as those produced by Union Carbide, Wyandotte Chemical, and others. The application and the choice of surfactants can readily be determined by one skilled in this art.

In some applications, forming the sorbent itself into a sheet form may be preferred over the use of a constraining means. In such an application, the sorbent can be woven, needle punched, or formed into a sheet by another conventional processes, so as to retain structural integrity without the use of a constraining means while possessing the necessary void volume for the wicking process.

Once the sorbent has been constrained or formed into a sheet, it can be utilized to adsorb petroleum-based products. The particular size and shape of the sorbent are first determined according to the type and size of petroleum-based product spill. For example, large tubular constraining means are preferred for use in adsorbing oil spills from the surface of the ocean, while small tubular constraining means are preferred for use around the base of a machine to adsorb leaking oils. On the other hand, in adsorbing an oil spill on a dry surface, such as a road, a sorbent sheet is typically preferred.

The adsorption process comprises placing the sorbent sheet or constrained sorbent in intimate contact with the petroleum-based product such that the sorbent directly contacts and therefore adsorbs the petroleum-based product. When the sorbent is constrained, the constraining means either adsorbs the petroleum-based product or allows the passage of the petroleum-based product through the constraining means. Upon passage through or adsorption by the constraining means, the petroleum-based product intimately contacts and is adsorbed by the sorbent. If the petroleum-based product spill is on the surface of the water, the sorbent selectively adsorbs the petroleum-based product while adsorbing only minimal water.

The present invention will be clarified with reference to the following illustrative examples. These examples are given to illustrate the process of forming and the use of the sorbent of the present invention. They are not, however, meant to limit the general scope of the present invention.

Test data, to date, has been obtained from waste materials from automobile acoustic panels after the panels have been molded and cut to net shape. This waste material was produced by forming a fiber-resin mixture, partially curing the mixture, processing, net molding, and thereby finally curing the partially cured mixture to form the panel, and cutting the panel to net shape. This waste material was sheared, constrained, and tested.

EXAMPLE I

The following example can be utilized to form and use the sorbent of the present invention having 20 wt. % Durite ® and 80 wt. % shoddy.

1. One hundred and twenty grams of shoddy is air laid on a belt and dusted with 30 grams of Durite ®.
2. The dusted shoddy is broken apart and tumble mixed by high speed air to substantially evenly distribute the Durite ® throughout the shoddy, creating a shoddy-Durite ® mixture.
3. The shoddy-Durite ® mixture is then air laid on a belt to a thickness of about 5 inches, and is heated to 325° F. for 30 seconds to partially cure the Durite ®.
4. The partially cured shoddy-Durite ® mixture is heated and pressed in a hot oil press at about 450° F. for about 2 min. to cross-link the Durite ® and form the sorbent.
5. This sorbent is then pickered to separate the fibers and reduce the sorbent bulk density.
6. The pickered sorbent is constrained within a nylon netting in the form of a sock, 5 inches in diameter and 12 feet long, to a density of 0.007 g/cm$^3$.
7. The constrained sorbent is then placed around the base of a machine where it contacts and adsorbs oil leaking from the machine, thereby preventing the oil from spreading beyond the constrained sorbent.

EXAMPLE II

The following example can be utilized to form and use the sorbent of the present invention having 20 wt. % Durite ® and 80 wt. % shoddy.

1. One hundred and twenty grams of shoddy is air laid on a belt and dusted with 30 grams of Durite ®.
2. The dusted shoddy is broken apart and tumble mixed by high speed air to substantially evenly distribute the Durite ® throughout the shoddy, creating a shoddy-Durite ® mixture.
3. The shoddy-Durite ® is air laid on a belt to a thickness of about 5 inches and is heated to 375° F. for 3 minutes to cross-link the Durite ® and form the sorbent.
4. The sorbent is then pickered to separate the fibers and reduce the sorbent bulk density.
5. The pickered sorbent is constrained within a polyester netting in the form of a sock, 5 inches in diameter and 12 feet long, to a density of 0.007 g/cm$^3$.
6. The constrained sorbent is placed around the base of a machine where it contacts and adsorbs oil leaking from the machine, thereby preventing the oil from spreading beyond the constrained sorbent.

Figure 2:
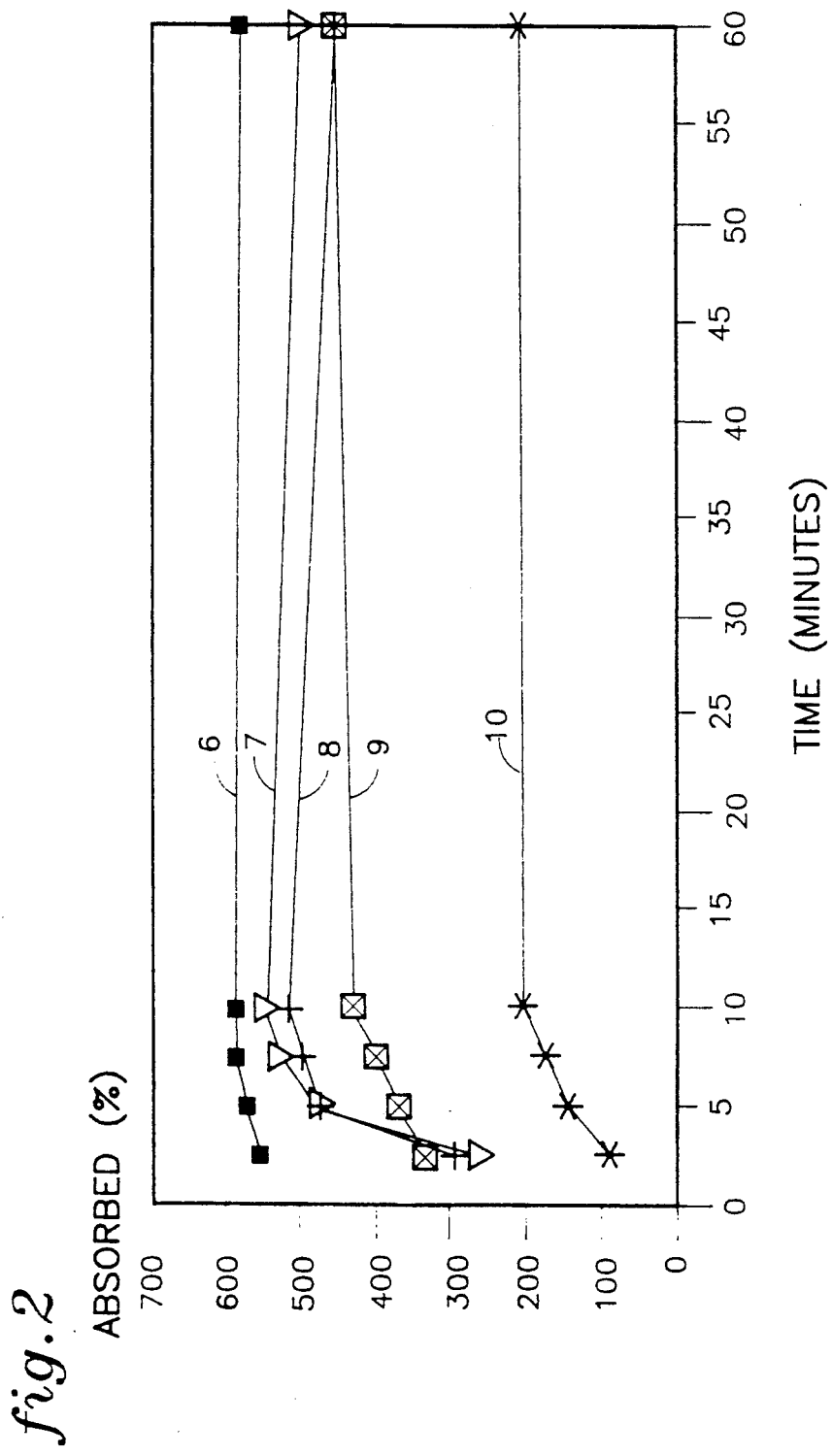
FIG. 2 is a graph of the adsorption efficiency of a prior art sorbent, over time.

The sorbent of the present invention is capable of preferentially adsorbing petroleum-based products over water. Referring to FIGS. 1 and 2, which are meant to be exemplary, not limiting, the adsorption characteristics of the present invention, and that of a prior art sorbent are illustrated. In FIG. 1, it can be seen that the sorbent of the present invention tends to adsorb greater amounts of petroleum-based products (lines 1-4), hydraulic oil, gasoline, 10W-30 oil, and crude oil respectively, than water (line 5) when tested separately. On the other hand, the prior art sorbent adsorbs greater amounts of water (line 6; FIG. 2) than petroleum-based products (lines 7-10), hydraulic oil, 10W-30 oil, gasoline, and crude oil respectively.

With an affinity for petroleum-based products over water, a greater percentage of the sorbent's adsorption capacity will be utilized to remove petroleum-based products from the surface of the water than the percentage of the prior art sorbent's capacity used for the same function. Furthermore, the sorbent's lower affinity for water causes the sorbent to float on the water surface even after adsorbing the petroleum product, thereby making the recovery of the used sorbent from the water surface simple. Additionally, upon recovery, the used sorbent retains the petroleum-based product with little or no dripping.

The present invention is an efficient, environmentally sound process for adsorbing petroleum products since the sorbent comprises recycled materials. The sorbent itself can be waste material from various manufacturing processes which combine resin and fibers and cross-links the resin. For example, the sorbent can be waste materials from acoustic panels produced in the automotive industry. These acoustic panels comprise resinated shoddy which is heat treated to partially-cure the resin, heat molded and pressed to net shape to form the panel and cross-link the resin, and finally cut to net shape. The waste materials produced can be pickered and utilized as sorbent to adsorb petroleum products as opposed to becoming land fill.

Although this invention has been shown and described with respect to detailed embodiments thereof, it will be understood by those in the art that various changes in form and detail thereof may be made without departing from the spirit and scope of the claimed invention.

We claim:

1. A method for adsorbing a petroleum-based product, comprising: intimately contacting the petroleum-based product with a sorbent such that said petroleum-based product is selectively adsorbed into said sorbent wherein said sorbent consists essentially of about 5 wt. % to about 70 wt. % cross-linked phenolic resin and about 30 wt. % to about 95 wt. % of a fibrous material comprising about 50% cellulose and about 40% polyester.

2. A method for adsorbing a petroleum-based product as in claim 1, wherein said sorbent is constrained within a constraining means.

3. A method for adsorbing a petroleum-based product as in claim 1, wherein said petroleum-based product is oil-based, gasoline, or a mixture thereof.

4. A method for adsorbing a petroleum-based product as in claim 1 wherein said resin is phenol-formaldehyde resin.

5. A method for adsorbing a petroleum-based product as in claim 4 wherein said resin is a two-stage phenol-formaldehyde resin powder.

6. A method for adsorbing a petroleum-based product as in claim 1 wherein, said sorbent has a bulk density of about 0.005 to about 0.05 grams per cubic centimeter.

7. A method for adsorbing a petroleum-based product, comprising: intimately contacting the petroleum-based product with a sorbent such that said petroleum-based product is selectively adsorbed into said sorbent, wherein said sorbent consists essentially of about 15 wt. % to about 35 wt. % cross-linked phenolic resin and about 65 wt. % to about 85 wt. % of a fibrous material comprising about 50% cellulose and about 40% polyester.

8. A method for adsorbing a petroleum-based product as in claim 7, wherein said sorbent is constrained within a constraining means.

9. A method for adsorbing a petroleum-based product as in claim 8, wherein said resin is phenol-formaldehyde resin.

10. A method for adsorbing a petroleum-based product as in claim 9, wherein said resin is a two-stage phenol-formaldehyde resin powder.

11. A method for adsorbing a petroleum-based product as in claim 10, wherein said petroleum-based product is oil-based, gasoline, or a mixture thereof.

12. A method for adsorbing a petroleum-based product as in claim 7, wherein said sorbent has a bulk density of about 0.005 to 0.05 grams per cubic centimeter.

* * * * *

UNITED STATES PATENT AND TRADEMARK OFFICE
CERTIFICATE OF CORRECTION

PATENT NO. :  5,308,497
DATED      :  May 3, 1994
INVENTOR(S) : Raymond T. O'Donnell
              Melvin J. Schaub It is certified that error appears in the above-indentified patent and that said Letters Patent is hereby corrected as shown below:

On the title page, item 54:

In the title:  "METHOD OF ABSORBING
                         PETROLEUM-BASED PRODUCTS"

should be

-- METHOD OF ADSORBING
       PETROLEUM-BASED PRODUCTS --

Signed and Sealed this

Ninth Day of August, 1994

Attest:

BRUCE LEHMAN

Attesting Officer      *Commissioner of Patents and Trademarks*